United States Patent [19]
Yacobi

[11] Patent Number: 5,872,844
[45] Date of Patent: Feb. 16, 1999

[54] SYSTEM AND METHOD FOR DETECTING FRAUDULENT EXPENDITURE OF TRANSFERABLE ELECTRONIC ASSETS

[75] Inventor: Yacov Yacobi, Mercer Island, Wash.

[73] Assignee: Microsoft Corporation, Redmond, Wash.

[21] Appl. No.: 751,311

[22] Filed: Nov. 18, 1996

[51] Int. Cl.$^6$ .............................. H04K 1/00; H04L 9/00
[52] U.S. Cl. .............................. 380/24; 380/23; 380/25; 705/39; 705/41; 705/42
[58] Field of Search ............................ 380/23, 24, 25; 705/39, 41, 42

[56] References Cited

U.S. PATENT DOCUMENTS

| | | | |
|---|---|---|---|
| 4,914,698 | 4/1990 | Chaum | 380/30 |
| 4,977,595 | 12/1990 | Ohta et al. | 380/24 |
| 4,987,593 | 1/1991 | Chaum | 380/3 |
| 5,224,162 | 6/1993 | Okamoto et al. | 380/24 |
| 5,453,601 | 9/1995 | Rosen | 235/379 |
| 5,455,407 | 10/1995 | Rosen | 235/380 |
| 5,511,121 | 4/1996 | Yacobi | 380/24 |
| 5,623,547 | 4/1997 | Jones | 380/24 |

*Primary Examiner*—David Cain
*Assistant Examiner*—Hrayr A. Sayadian
*Attorney, Agent, or Firm*—Lee & Hayes, PLLC

[57] ABSTRACT

An electronic asset system includes tamper-resistant electronic wallets that store transferable electronic assets. To break such tamper-resistant wallets, the criminal is expected to spend an initial investment to defeat the tamper-resistant protection. The electronic assets are issued by an institution to a wallet (anonymously or non-anonymously). During expenditure, the electronic assets are transferred from a payer wallet to a payee wallet. The payee wallets routinely submit the transferred assets for possible audit. A fraud detection system samples the assets submitted for audit to detect "bad" assets which have been used in a fraudulent manner. Upon detection, the fraud detection system identifies the electronic wallet that used the bad asset and marks it as a "bad wallet". The fraud detection system compiles a list of bad electronic wallets and distributes the list to warn other wallets of the bad electronic wallets. The list is relatively small since it only contains identities of certificates of bad wallets (and not bad coins) and the certificates have short expiration terms, and hence can be stored locally on each wallet. When a bad wallet next attempts to spend assets (whether fraudulently or not), the intended recipient will check the local hot list of bad wallets and refuse to transact business with the bad wallet.

67 Claims, 5 Drawing Sheets

SYSTEM AND METHOD FOR DETECTING FRAUDULENT EXPENDITURE OF TRANSFERABLE ELECTRONIC ASSETS

TECHNICAL FIELD

This invention relates to systems which exchange electronic assets as representations of value. More particularly, the invention relates to systems and methods for detecting fraudulent use of electronic assets which may be transferred from one party to another.

BACKGROUND OF THE INVENTION

Electronic assets are digital representations of value. Electronic assets might be used to represent cash, coins, tokens, entertainment tickets, government entitlement provisions, and so one.

One attribute of electronic assets is transferability. Transferable electronic assets are similar to paper dollars in that the same assets can be exchanged, traded, and reused numerous times. Non-transferable electronic assets are used only once, and then retired from circulation after this single use; they are not reused numerous times. U.S. patent application Ser. No. 08/600,409, entitled "System and Method for Detecting Fraudulent Expenditure of Electronic Assets," which was filed on Feb. 12, 1996, in the name of Yacov Yacobi and assigned to Microsoft Corporation, describes a system involving non-transferable electronic assets. This invention is particularly directed to transferable electronic assets, although it scales to non-transferable electronic assets as well.

Electronic assets are long, mostly random binary strings, with some relatively small recognizable pattern that are signed by the issuer. For instance, an electronic asset might consist of 500 bits in which the left most 400 bits are truly random, the right most 50 bits are an identifiable string (e.g., all binary zeroes), and the intervening 50 bits are an expiration date. The binary strings are typically generated by an institution that issues the electronic assets. Banks, ticket companies, federal or local government, and businesses are all possible issuers of different kinds of electronic assets.

Once issued, the electronic assets are carried in an electronic storage facility, often referred to as an "electronic wallet." Electronic wallets are tamper-resistant storage devices which make it difficult to commit fraud. The size of the electronic wallet depends upon the kind and amount of assets to be stored thereon. As an example, with current design, an electronic wallet uses approximately 100 kilobytes of memory to store $100 in units of $1 digital coins. It should be noted that other e-wallet designs, where only the balance is stored and not individual coins, require much less storage (however, they do not have a good fraud detection criteria).

Driven by technological advances, there is an increasing desire to conduct more commerce electronically, thereby replacing traditional asset forms (bills, coins, ticket paper, etc.) with electronic assets that represent them. A big segment of commerce is found at the low end of the value scale. This commerce involves values equivalent to present day cash, such as paper bills (i.e., $1, $5, $10, $20, $50, and $100 bills) and coins (i.e., nickels, dimes, quarters, half-dollars, and dollars). It is this low end of the market where online systems are too expensive or too slow. Users are also more likely to desire anonymity for low end purchases since they may dislike or distrust a system where every purchase, down to every vending machine and toll bridge, is monitored and traced. Additionally, this low value end is where fraud is likely to germinate because there is less incentive to detect fraud due to the small value involved. In contrast, transactions involving electronic assets at the higher end of the value scale are more closely scrutinized by both parties and are often guided by rigid protocols involving signatures and confirmation of available funds for the transactions. Also, in the higher end of the market, where credit and checks are used, the danger of forging money does not exist, since the bank is checking each transaction before approving it. Although there remains a danger of users cheating each other, there is no danger of cheating the banking system, the Federal Reserve, and so on. This danger, however, exists with cash-like systems.

One main problem with electronic assets is that they can be easily duplicated. Unlike paper dollars or coins, a string of bits that constitutes the electronic assets can be easily and rapidly replicated using computers. This presents a significant risk of fraud. Criminals can reproduce the bit string of an asset and pass off the forged or counterfeited electronic assets as real. To the recipient, the counterfeit bit string offered by the criminal is identical to the expected asset bit string, rendering it difficult to detect whether the offered bit string is the original asset or a reproduced asset that has been used many times before. If successful, the criminals have the opportunity to multi-spend the same asset many times. This type of digital fraud is known as "double spending."

One proposed solution to this problem is to devise a system that prohibits double spending. This solution is centered on use of a tamper-proof electronic wallet which, by its design, makes it nearly impossible to modify or clone the wallet to perform fraudulent transactions. Unfortunately, such designs are never truly tamper-"proof," rather just tamper-"resistant." In other words, if criminals are willing to invest the necessary capital, albeit large, they can reverse engineer the electronic wallet to perform fraudulent tasks. The cost of breaking tamper-resistant devices varies dramatically with the technology and the evolution of technology over time.

Another proposed solution to double spending is to develop an online banking system to discover assets which have been double spent. In this system, each electronic asset that is spent is collected by a central bank or other institution and evaluated for possible double expenditure. Since the asset is non-transferable and can be spent only once, the discovery of identical assets reveals that the asset has been double spent. When a recipient receives a new asset, it uses the online banking network to determine whether that same asset has been previously spent. The primary drawbacks of the online approach are the high expense involved in managing an online system and the potentially long delay periods experienced when a recipient is attempting to verify a new asset. In addition, for the very large data bases required here, the current cost per transaction is too high for sub $1 transactions; hence, batching deposits into aggregates of total value $100, as proposed here, make it cost-effective. Another drawback is that not all recipients are online with the bank. For instance, the assets might be used in off-line devices, such as vending machines or toll booths. Networking all possible recipient machines would be extremely expensive.

A variation of the online bank system is for the bank to offer "after the fact" exposure of double spenders, which is particularly used in anonymous electronic asset systems. In this scenario, the bank evaluates each spent asset for possible double spending. As long as the user follows the stipulated guidelines and spends each asset only once, the user remains anonymous. However, if the user multi-spends the same asset, the bank detects the fraud and has enough information to identify the criminal user. Those culprits are then sought out and prosecuted.

Like the online system, however, this "after the fact" system has drawbacks in the enormous size and expense required to store and track every asset. Moreover, due to the shear volume of assets being evaluated, detection and enforcement might be delayed long enough for the criminal to make an illegitimate profit and then slip away before being apprehended.

Accordingly, there is a need to design a system which facilitates use of electronic assets, even in the low value commerce segment, while detecting and preventing fraud. Such a system should also satisfy countervailing goals of being efficient, reliable, and cost effective.

SUMMARY OF THE INVENTION

This invention concerns an electronic asset architecture which replaces or subsidizes expensive and inefficient deterministic fraud detection with probabilistic fraud detection. This architecture attempts to detect fraud and eliminate further fraud before the criminal has had an opportunity to profit illegitimately.

According to one aspect of this invention, an electronic asset system includes tamper-resistant electronic wallets which store transferable electronic assets. The tamper-resistant wallets are implemented as small portable computing devices with their own trusted displays and keyboards, such as hand held computers, personal digital assistants, or laptop computers. A less sophisticated electronic wallet may be implemented as a smart card, PC card, or other technology which permit receipt, storage, and output of electronic assets. The tamper-resistant technology makes it difficult to directly open the wallet's memory and obtain the stored assets, or to communicate with the wallet other than as specified by certain cryptographic protocol, which also protects the communication channel. To break such tamper-resistant wallets, the criminal is anticipated to make an initial investment to defeat the tamper-resistant protection.

The electronic assets stored on the wallets can be in the form of cash, tokens, government entitlements, or the like. The assets are uniquely issued by an institution and assigned to a particular wallet. The assets are digitally signed by the issuing institution. In one implementation, the issuing body issues a stick of multiple electronic assets, and digitally signs the stick once, as opposed to each asset individually. This allows greater efficiency in the issuing process. This is very similar to the Rivest-Shamir "MicroMint" scheme, with the difference that the electronic wallets are free to transfer the assets to any payee, and are not restricted to a single dedicated payee.

During expenditure, a payer wallet transfers the electronic assets to a payee wallet, which can be a wallet owned by a merchant, a vendor, or another party or entity. The transferable assets may be transferred a number of times up to a preset limit, and thereafter, are marked as exhausted. Exhausted assets are eventually retired to a bank or other collecting institution (which may or may not be the same as the issuing institution).

As an electronic asset is transferred from wallet to wallet, each payer wallet digitally signs the electronic asset with its cryptographic signing key before passing the asset onto the payee wallet. This produces a historical registry of signatures of all the wallets that have handled and transferred the electronic asset. More specifically, during a transfer, the payer wallet generates a new version of the electronic asset, $T_{new}$, which is based on the previous version of the electronic asset, $T_{old}$. The new version of the electronic asset is created as follows:

$$T_{new} = T_{old}, S_{Kpayer}[Hash(Payer\ ID, T_{old}, time, Payee\ ID)]$$

where "Hash" is a hashing function used to compute a hash digest of data which includes the payer wallet ID, the previous version of the electronic asset $T_{old}$, a time of the transfer, and the payee wallet ID. This hash digest is then signed according to a signing function "$S_{Kpayer}$" using the cryptographic signing key of the payer electronic wallet. The signed hash is concatenated with the old version of the asset $T_{old}$ and passed onto the payee wallet.

The electronic asset system further includes a fraud detection system which samples a subset of the assets transferred from the payer wallets to the payee wallets. Each transferred asset is subject to being audited, with an exemplary sample rate being one in every 100 assets. The payee wallets are equipped with transmitters to send the transferred assets over a network, such as the Internet, to the fraud detection system.

The fraud detection system uses the sample to detect "bad" assets which have been used in a fraudulent manner. Each asset is analyzed to determine whether it was transferred from a single payer wallet to multiple payee wallets. The multiple transfers of the same asset from one payer wallet evidences that a fraud was committed.

Upon detection, the fraud detection system identifies the payer wallets that transferred the bad assets and marks the payer wallets as "bad." The fraud detection system then compiles a list of bad wallets and posts the list to warn other wallets. The list (which is also referred to as a "hot list" or "revocation list") is broadcast to the electronic wallets over a data communication network, such as a public network (e.g., the Internet) or a wireless network (e.g., cellular phone and paging network). The wallets are equipped with receivers to receive the broadcast transmission of the list. The entire list can also be posted to a central location (e.g., an Internet web site) so that anybody can access and download it.

The hot list of bad wallets is relatively short because it only contains the identities of bad wallets (and not individual bad coins) and because the certificates issued to the wallet have comparatively short expiration terms. As a result, the hot list can be stored locally on each electronic wallet. The fraud detection system can rebroadcast the entire list, or updates to the list containing only the identities of the bad wallets which are added to the list since the last audit interval. When a bad wallet on the list next attempts to spend assets (whether fraudulently or not), the intended payee wallet will refuse to transact business with the bad wallet.

According to this probabilistic fraud detection scheme, the criminal might successfully double spend electronic assets during initial transactions. But, due to early detection through sampling, the criminal is eventually prevented from further fraudulent use of the bad wallet. The fraud detection occurs with high probability before the criminal can break-even on the initial investment required to clone the wallet in the first place and make an illegitimate profit. Once fraud is detected, further perpetuation is prevented.

DETAILED DESCRIPTION OF THE PREFERRED EMBODIMENT

The following discussion assumes that the reader is familiar with electronic assets (or "electronic tokens" or "digital cash") and cryptography. For a basic introduction of digital cash and cryptography, the reader is directed to a text written by Bruce Schneier and entitled "Applied Cryptography: Protocols, Algorithms, and Source Code in C," published by John Wiley & Sons with copyright 1994, which is hereby incorporated by reference.

Figure 1:
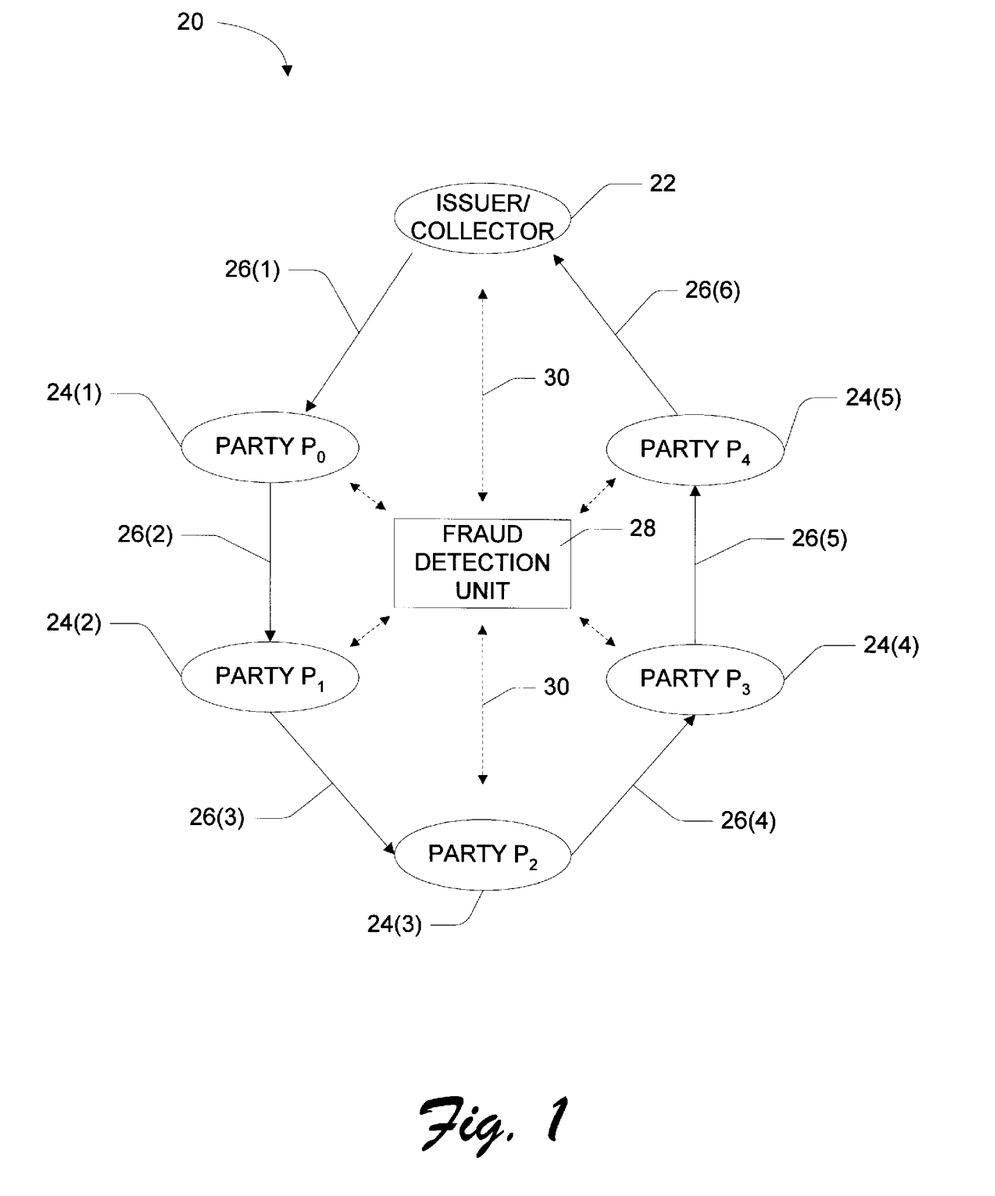
FIG. 1 is a general diagrammatic illustration of an electronic asset system.

FIG. 1 generally shows an electronic asset system 20 in which electronic assets are issued, spent, and ultimately expired. As used in this disclosure, the term "electronic asset" means an electronic representation of value, typically expressed in binary bits, and might include tickets, tokens, cash, coins, government entitlements, or the like. A "non-transferable electronic asset" is an electronic asset that is uniquely issued for a single use and are then retired from circulation after the one use. Unlike traditional cash, non-transferable electronic assets are not reused numerous times. A "transferable electronic asset" is an electronic asset that may be transferred multiple times, similar to real currency. A system involving non-transferable electronic assets is described in U.S. patent application Ser. No. 08/600,409, entitled "System and Method for Detecting Fraudulent Expenditure of Electronic Assets," which was filed on Feb. 12, 1996, in the name of Yacov Yacobi and assigned to Microsoft Corporation. The '409 application is hereby incorporated by reference. Aspects of this invention are directed primarily to transferable electronic assets, although there is general applicability to non-transferable assets as well.

The electronic asset system 20 includes an issuer/collector 22 and multiple parties 24(1)–24(5). In this most basic model, the issuing entity functions as the collecting entity, although the two can be separate entities. Electronic assets are transferred from one entity to the next as shown by the arrows from issuer/collector 22 to parties 24(1)–24(5), and back to the issuer/collector 22. Each party 24(1)–24(5) is a "payee" in that each is capable of receiving the electronic asset from another entity and a "payer" in that each is capable of giving the asset to another entity.

The issuer and each party possesses tamper-resistant hardware/software devices. Communication channels 26(1)–26(6) facilitate communication among the issuer/collector 22 and the parties 24(1)–24(5). The channels are representative of many different types of connections, including direct local connections or remote connections over a communication network, such as a public network (e.g., the Internet, telephone, cable TV, etc.) or a wireless network (e.g., cellular phone, paging network, satellite, etc.). These channels are secured using cryptography protocol. More specifically, the communication between participants can be accomplished using secure channel protocols as well as secure messaging protocols.

All parties initially register with a certifying authority (not shown). In some environments, the issuer 22 also functions as the certifying authority. Alternatively, the registering function is performed by a separate entity, which is trusted by the issuer 22 and the parties 24(1)–24(5). The certifying authority issues certificates that are later used by the parties in a transaction to verify the identity of each other. The certifying authority's role is limited to the registration process and has no part of the payment transaction after this initial registration process.

The issuer 22 issues transferable assets to the first party $P_0$ 24(1). This issuance represents many different types of transactions. For example, the issuer 22 might be a bank and the first party 24(1) might be an account holder who is withdrawing assets from his/her account. A bank withdrawal transaction can be conducted over an online network connection 26(1), such as over a private banking network connection (e.g., ATM—automatic teller machine), or over a public network connection (e.g., the Internet) using commercial banking programs like Money from Microsoft Corporation. In another example, the issuer 22 might be a public transit authority, and the party 24(1) might be a citizen who purchases tokens to ride on the public transportation system. In this case, the network connection 26(1) might be established at an off-line point-of-sale vending machine that issues tokens to the user's electronic transit card.

The newly issued asset for the initial transfer, which is designated as "$T_0$," includes the issuer identification ("I"), a time of transfer ("$t_0$"), the identification of the first party 24(1) ("$P_0$"), and unique asset-related data ("X"). The asset data X is a concatenation of a value, a serial number, an expiration date, and a long string of random bits that are chosen by the issuer. The issuer digitally signs the asset upon the issuing transfer to party 24(1), using a secret signing key of a cryptographic key pair that is unique to the issuer. The asset at the first transfer is thus represented as:

$$T_0 = S_{Kissuer}[I, t_0, P_0, X]$$

where the function "$S_{Kissuer}$" is a signing function using the secret signing key of the issuer.

Digitally signing each asset may be a poor utilization of the issuer's computing resources, especially for assets of low value (e.g., $1 coins). As an alternative, the issuer 22 may wish to issue a set or "stick" of assets, and sign only the stick as opposed to each individual asset. This stick minting process provides better utilization of the issuer's computing resources, enabling the issuer to accommodate a large number of withdrawing customers.

According to the stick minting process, the withdrawing party $P_0$ requests a stick of assets of size L. For instance, the party $P_0$ might request a stick of one hundred $1 coins. Assuming the party $P_0$ has the appropriate balance or credit in their account, the issuer 22 creates a stick of size L. To produce this stick, the issuer 22 selects the asset-related data X and runs it through a one-way function L times. One suitable one way function is SHA. Let $h^i(x)$ denote i application of the hash function $h(\ )$, for $i=1, 2, \ldots, L$. The result of the last hash operation, designated as variable y so that $y=h^L(x)$ is concatenated with the identification of the withdrawing party's $P_0$ and digitally signed by the issuer to produce the issuer's signature, as follows:

$$\text{Issuer's Signature} = S_{Kissuer}[y, P_0]$$

The withdrawing party $P_0$ can spend or transfer individual assets from the stick to any other entity, without spending other assets on the stick. With each asset, the party $P_0$ transfers the data X, asset place i, and the issuer's signature.

Individual assets may be transferred a number of times, designated by a variable "k," before the assets are exhausted. As an example, each asset might be capable of being handed off ten times, for k=10. The number of permitted transfers can be established as a parameter for the entire electronic asset system, whereby a system that allows transferability of assets through k hands is called a "k-off" system. Every wallet that is capable of receiving and transferring assets in the k-off system is referred to as a "k-off" wallet. A k-off electronic wallet is a tamper-resistant device that is small and preferably portable. The k-off electronic wallet has memory to store the assets and cryptographic capabilities to store and manage public/private signing/encryption keys and certificates. The k-off electronic wallet is also equipped with a transmitter to communicate data over a network (e.g., Internet, cellular, RF, etc.) and a receiver to receive data over the same or a different network. The receiver is preferably a pager receiver for receiving messages from the fraud detection unit. The k-off electronic wallet can be implemented as a portable device with its own trusted display and keyboard, such as a hand held computer, a personal digital assistant, or a laptop computer.

A special case of the k-off wallet is a 1-off wallet (i.e., k=1) which is an electronic wallet that can only receive assets from the issuer. The 1-off wallet can be the first transfer in a chain in which later players are k-off wallets. The 1-off wallet is a low cost, rudimentary electronic wallet which can be implemented, for example, as a smart card, a PC card (formerly known as a PCMCIA card), or other IC card.

The electronic wallets are designed to hold a maximum dollar value (e.g., $100). The wallet is required to deposit assets when it reaches this upper bound or spend the assets (for the k-off wallets), before it can receive more assets.

In the FIG. 1 example, the electronic asset system 20 might be considered a 6-off system (i.e., k=6). The transferability chain is depicted as:

Issuer→$P_0$→$P_1$→$P_2$→$P_3$→$P_4$→Collector.

More generally, a k-off system has a transferability chain along the party's wallets which has k or less transfers. The transferability chain for a general k-off system is given as follows:

Issuer→$P_0$→$P_1$→ ... →$P_j$→Collector, $j \leq k$.

During each transaction between a payer and payee, a payer spends or uses an asset in some manner by transferring the asset to the payee. For example, the payer might be a consumer and the payee might be a merchant, with the purchase occurring over a public network connection. In another example, the payer might be a thirsty individual and the payee might be a beverage vending machine, with the communication link being an off-line direct connection at the vending machine. Still another example is for the payer to be one business entity and the payee to be another business entity.

Electronically, a transaction involves downloading the electronic assets from the payer's electronic wallet to the payee's electronic wallet. The payer digitally signs the assets before spending them. Each asset grows in bit length each time it is spent by virtue of the added payer's signature. As a result, each asset compiles a registry of signatures which lists all of the wallets that have handled and transferred the electronic asset. The payee electronic wallet verifies the signatures of the issuer and each payer in the transferability chain to ensure that they are valid (i.e., certificates not expired or revoked), and that the assets themselves have not expired. If all is positive, the payee accepts the assets as a valid payment and the assets are transferred from the payer's wallet.

To describe an exemplary transaction in more detail, suppose party $P_0$ 24(1) is a payer and party $P_1$ 24(2) is the payee. The payer $P_0$ desires to pay the asset $T_0$, which was issued from the issuer 22 as described above, to the payee $P_1$ over the communication data link 26(2). The payer wallet generates a next version of the electronic asset, or "$T_1$," which is based on the previous version of the electronic asset "$T_0$." The new version of the electronic asset is created as follows:

$$T_1 = T_0, S_{Kpayer}[\text{Hash}(P_0, T_0, \text{time}, P_1)]$$

where "Hash" is a one-way hashing function used to compute a hash digest of a concatenation of the payer's ID $P_0$, the old version of the electronic asset $T_0$, a time of the transfer, and the payee's ID $P_1$. This hash digest is signed according to a public key cryptography signing function "$S_{Kpayer}$" using the cryptographic signing key of the payer's electronic wallet. The signed hash is concatenated with the old version of the asset $T_0$ and passed onto the payee wallet.

This formula can be generalized for each transfer in the transferability chain as follows:

$$T_{i+1} = T_i, S_{Kpayer}[\text{Hash}(P_i, T_i, t_i, P_{i+1})],$$

for i=1 to j, and $j \leq k$.

The assets are eventually returned to the collector 22, where they are retired and deemed exhausted. In this final leg, the last payee 24(5) deposits the assets with the collector 22, which is shown to be the same as the issuer for discussion purposes. The collector 22 stores all of the incoming electronic assets and archives them until expiration. The last leg is representative of a merchant (party 24(5)) depositing receipts with a bank (collector 22) using a secure channel 26(6). Another example might be a token machine (party 24(5)) returning collected tokens to the public transit authority (collector 22), wherein the connection 26(6) is a secure transfer medium, such as a portable memory device with the deposited assets encrypted thereon.

The electronic asset system 20 also has a fraud detection unit 28 to evaluate a sampled subset of the electronic assets transferred among the parties 24(1)–24(5) to detect if any electronic assets have been used in a fraudulent manner. The parties 24(1)–24(5) forward samples of the assets to the fraud detection unit 28 on an ongoing basis. The sampling rate is controlled by the fraud detection unit 28 and varies in time and space to efficiently target suspected fraud patterns. The fraud detection unit evaluates the sampled assets to determine whether any single asset was transferred from a single payer wallet to multiple payee wallets. The multiple transfers of the same asset from one payer wallet evidences that a fraud has occurred.

Figure 2:
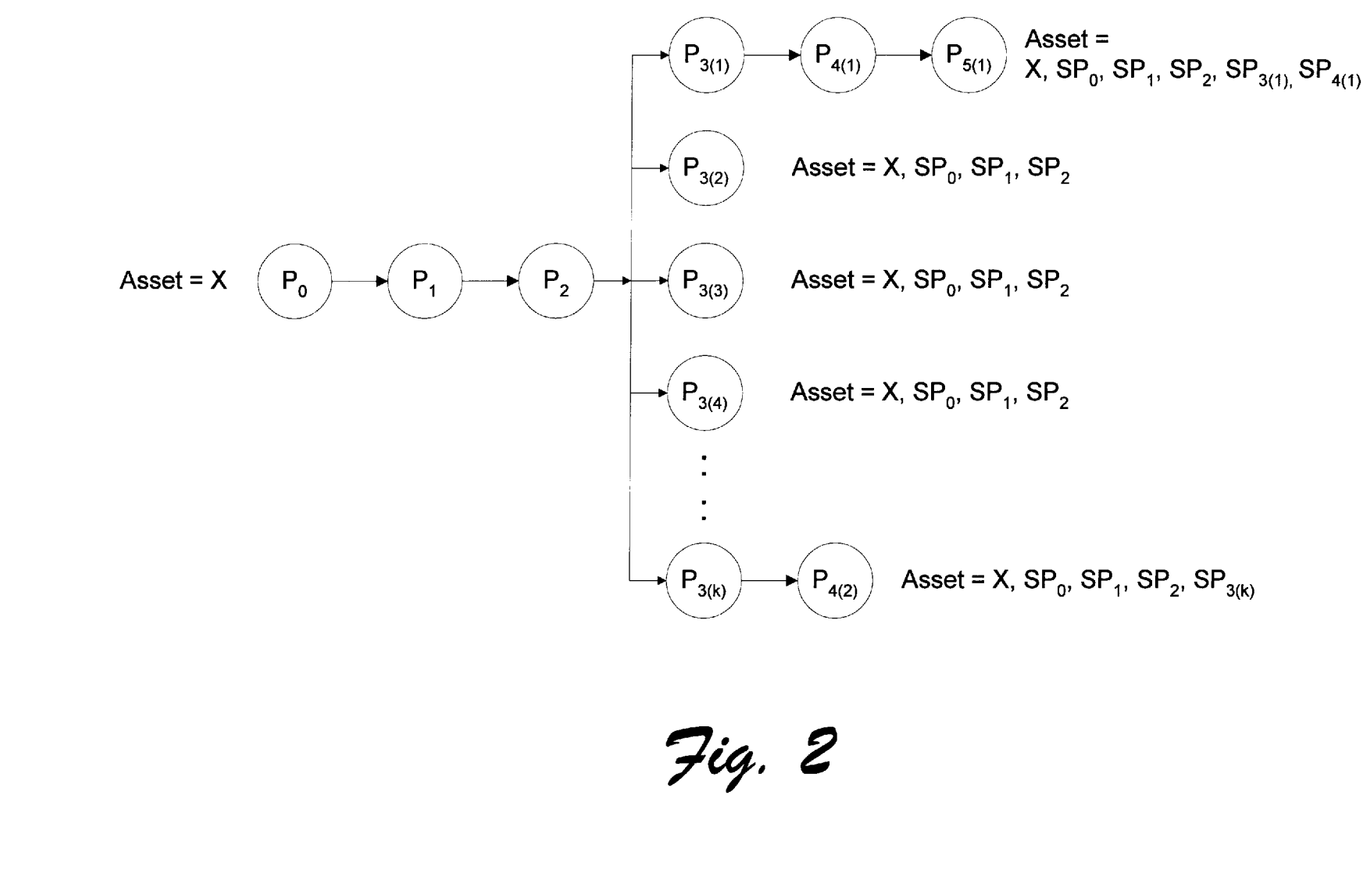
FIG. 2 is a diagrammatic illustration of a transferability chain of an electronic asset and fraudulent use of that asset by a criminal wallet.

FIG. 2 shows a diagrammatic illustration of an asset transferability chain and how the chain is distorted by a single criminal wallet when the asset is fraudulently used. An asset comprising a unique serial number, an expiration date, an issuer ID, and other information (generally designated as tag "X") is issued to party $P_0$. The party $P_0$ digitally signs the asset and transfers the asset to party $P_1$. Let $SP_0$ denote the signed asset. The party $P_1$ then digitally signs the asset to create $SP_1$, and transfers the asset to party $P_2$. Now, suppose that party $P_2$ is a criminal who attempts to fraudulently use the asset by reproducing it and spending it multiple times. The party $P_2$ digitally signs the asset to produce $SP_2$ and transfers the asset to multiple parties $P_{3(1)}$–$P_{3(k)}$. Party $P_{3(1)}$ signs and transfers the asset onto party $P_{4(1)}$, who in turn passes the asset onto party $P_{5(1)}$. Similarly, party $P_{3(k)}$ spends the asset by signing it and passing it onto party $P_{4(2)}$.

At this point, the same asset having a unique asset-related tag X has been spent multiple times by the same payer wallet $P_2$. The assets being held by parties $P_{5(1)}$, $P_{3(2)}$, $P_{3(3)}$, $P_{3(4)}$, and $P_{4(2)}$ have the same root signature string, as illustrated by each asset having the identical root X, $SP_0$, $SP_1$, and $SP_2$. During routine sampling, suppose the fraud detection unit samples the wallets of parties $P_{5(1)}$, $P_{3(3)}$, and $P_{4(2)}$. The fraud detection unit will quickly discover that the same asset was multiple spent as indicated by each asset having an identical root in the signature tree.

When fraudulent use is detected, the fraud detection unit 28 marks the electronic asset as "bad." The fraud detection unit 28 then uses the signature string to identify the electronic wallet that spent the bad electronic asset. In the FIG. 2 example, the fraud detection unit 28 traces asset signature string to party $P_2$ which is the last party to have signed each copy of the asset. Party $P_2$ is thus identified as the criminal wallet which double spent the same asset.

The fraud detection unit 28 compiles a list of tainted or bad wallets. The list is distributed to the wallets of all the parties 24(1)–24(5) to warn other parties of the bad wallets. The list can be distributed from the fraud detection unit 28 to the wallets 24(1)–24(5) in a number of different ways. The list might be broadcast over a data communications network (i.e., Internet, interactive television, telephone, cable TV, etc.) or a wireless communications network (e.g., cellular, paging, radio, etc.). The list might be posted at a publicly accessible location, such as a web site. Alternatively, the list might be transported or mailed on a storage medium. The list is routinely updated as subsequent bad wallets are identified. Updates to the list are preferably broadcast in periodic intervals (e.g., every five seconds) to ensure that the parties receiving assets are kept current.

The list is stored on each electronic wallet. Because the list of wallets is relatively small (as compared to a list of bad assets) and the wallets have short expiration terms (wallet expiration is synonymous with wallet certification expiration), the list is sufficiently short to store on individual wallets as an accountability measure. Moreover, each wallet can perform routine cleanup processes to remove expired hot listed wallets. In addition, only short hashes of the certificates are stored in the revocation list, to further save on space.

It is noted that only the more sophisticated k-off wallets are equipped with data receivers and hence, are capable of receiving the list. The less sophisticated 1-off wallets are unable to receive assets from other wallets (they only withdraw from the bank) and thus, it is unnecessary to download the list of bad wallets to the 1-off wallets.

With the list of bad wallets, the parties can check the list during each transaction with another wallet to determine whether that wallet is bad or legitimate. When a criminal payer subsequently attempts to use a bad wallet found on the list, the legitimate payee will refuse to transact business with the criminal payer. As a result, the payer is prevented from further promulgating fraud using the bad wallet.

Accordingly, the electronic asset system 20 employs an asset-level criteria to uncover fraudulent transactions, while accountability is at the wallet level. With random sampling, the fraud detection unit 28 only evaluates a tiny fraction of the transferred assets. For example, the fraud detection unit might only examine one out of every 100 transferred assets. This involves substantially less processing and storage resources in comparison to an online system which examines the entire set of exhausted assets (doing it in real time for each transaction). As a result, the fraud detection unit requires less bandwidth, is fast and efficient with less sensitivity to delays, and can sound an early warning to prevent subsequent fraud. In the case of an anonymous system (described more fully below), the fraud detection unit eliminates the need for detection processes aimed at "after the fact" exposure of double spenders.

Although the fraud detection unit 28 cannot detect all fraud, it has a statistically high probability of detecting fraud. For appropriate sampling rates, the detection probability can be 95% or better by the time the adversary breaks even with her investment. This probability is sufficient to prevent fraud because the criminal is highly likely to be detected before there is an opportunity to profit illegitimately from the fraud. A payer stores the electronic assets in a tamper-resistant electronic wallet. To successfully clone this electronic wallet, a criminal is expected to invest in a rather large sum of money. If the bad wallet is used to spend low valued electronic assets, such as $1 coins or tokens, the criminal would need to successfully use the bad wallet many, many times before breaking even with the initial investment. The fraud detection unit 28, through appropriate sampling rates, is highly likely to uncover the fraudulent use of the bad wallet well before the criminal has used it enough times to break even. Accordingly, the statistical sampling technique is effective at deterring economically motivated adversaries because the criminal is highly unlikely of ever breaking even on the investment.

While an asset-level criteria is used to uncover fraud, the electronic asset system 20 places accountability at the wallet level. Fraud is committed when the wallet is compromised. Accordingly, the hot list of bad wallets is used as a wallet-level criteria to root out bad wallets during their subsequent use. The list of bad wallets is sufficiently small to be given to all wallets. For example, assuming that wallets are configured with certificates that last for one year, a list of all bad wallets for a population of 30 million users, assuming 4% annual revocation, and 10 bytes per one hashed revoked certificate is anticipated to consume less than 10 megabyte of storage. If the life span of the certificate registered to the electronic wallet is reduced to one month, a list of bad wallets is anticipated to consume no more than 1 megabytes. At this latter size, the list can be stored on each individual wallet. These local lists are useful to the recipient because it eliminates a need for online verification of each asset being received. The recipient can simply check whether the wallet is on the hot list of bad wallets before completing a transaction.

The electronic asset system 20 is beneficial at reducing connectivity and online requirements, as well as the transactions costs typically associated with full online verification systems. For small transactions where the asset value is low (e.g., coins, tokens), continuous online connection to a banking or merchant system on a per transaction basis is too expensive. For instance, it is impractical to expect a beverage vending machine to validate each beverage purchase over a network with a localized vending hub computer. Even if the transaction cost was sufficiently low, the real time response delay would be too long and annoying to the consumer, who simply wants a beverage for 75 cents.

With the early warning fraud detection unit, however, only a few samples are required, not every transaction. The samples can be provided over a limited online connectivity (e.g., via the Internet), or in the case of a standalone machine, in a periodic batch effort. Upon compilation of bad wallet lists, the fraud detection unit 28 can transmit updated lists in real time; or for the standalone machine, the list is updated upon routine collection rounds. The volume of online communication is a few orders of magnitude smaller than a full online system and involves reasonably tolerant response delays.

Figure 3:
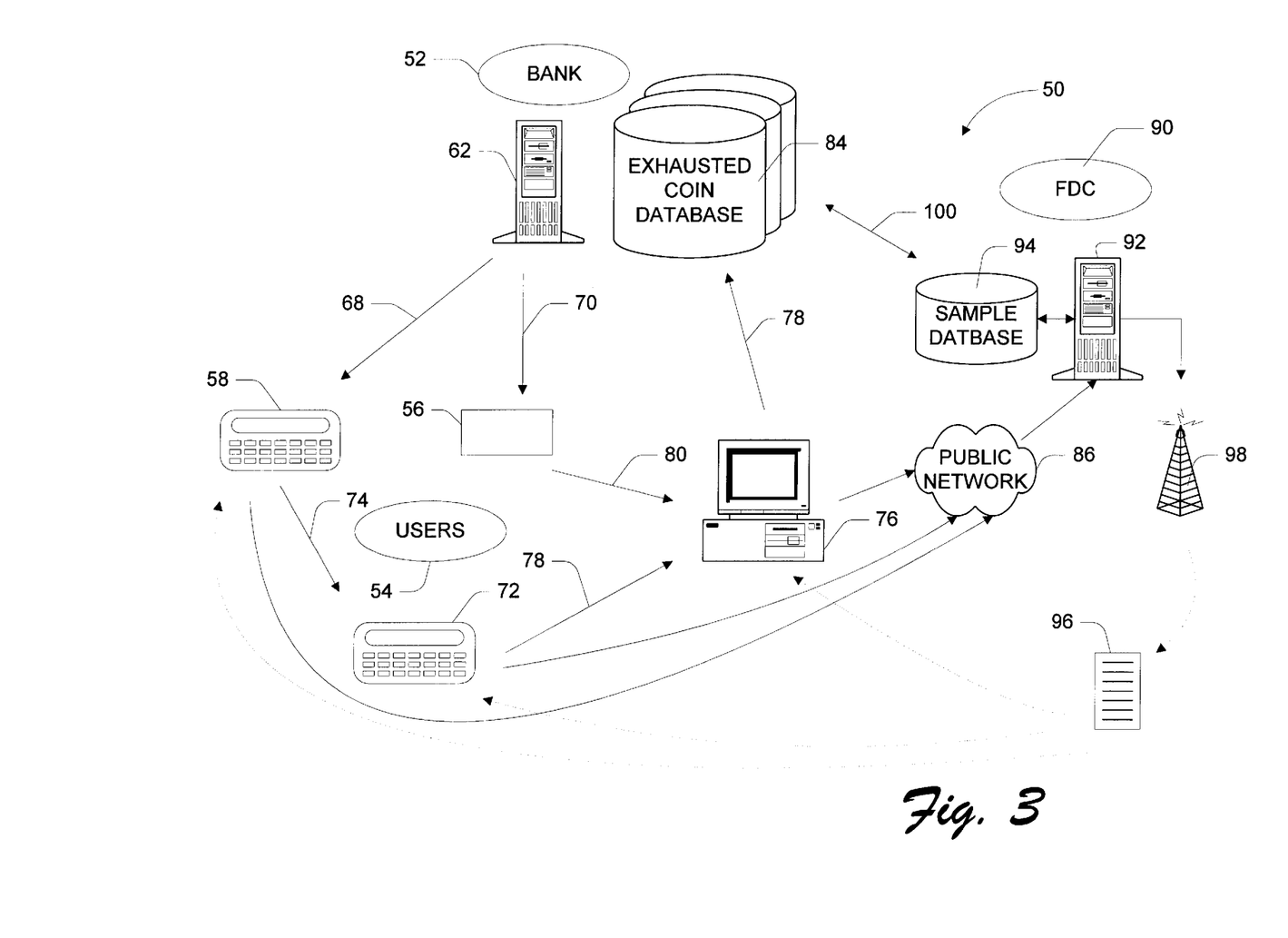
FIG. 3 is a diagrammatic illustration of the electronic asset system in more detail than the general FIG. 1 illustration.

FIG. 3 shows a more detailed example of an electronic asset system with fraud detection that is implemented in the context of a computerized electronic commerce system. The electronic asset system, referenced generally as number 50, includes a bank 52 and multiple users 54. For purposes of discussion, the bank 52 performs the dual functions of issuing the transferable assets and collecting them after they are deposited. Generally, the electronic asset system 50 can be implemented as a "anonymous" system in which assets are not traceable to the party who received them, or a "non-anonymous" system in which assets are traceable. The non-anonymous implementation is described first, with aspects of the anonymous implementation being described afterwards.

Non-Anonymous Electronic Asset System

To begin the process, each user 54 withdraws electronic assets in the form of electronic cash from the bank 52. In this context, assume that the bank 52 acts as a certifying authority. In this example, a 1-off electronic wallet 56 (illustrated in the form of a smart card or PC card) and a k-off electronic wallet 58 (illustrated in the form of a personal digital assistant or palmtop computer) withdraw electronic assets from the bank 52. Before this withdrawal, however, the users 54 initially require certification of the electronic wallets 56 and 58 (as well as the other wallets shown) before the wallets can be used to hold the electronic assets.

Figure 4:
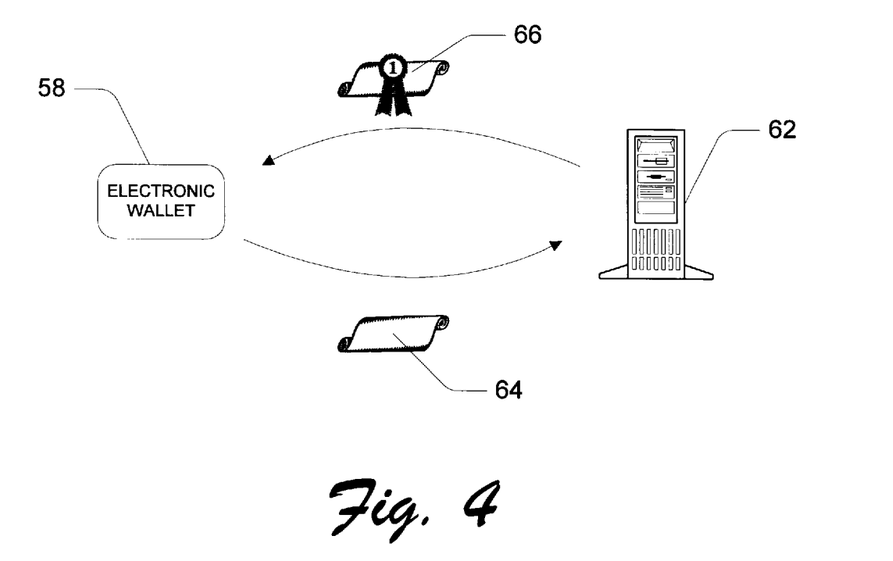
FIG. 4 is a diagrammatic illustration of a certification and withdrawal process in an electronic asset system which is implemented without anonymity.

FIG. 4 shows the certification process with respect to the k-off wallet 58. The k-off electronic wallet 58 is manufactured with initial pairs of public and private keys and a corresponding certificate that is registered with the certifying authority (or the bank, in this example). A certificate is a linkage of a public key and some identification (e.g. user, or wallet identification), which is signed by the certifying authority. (In the anonymous system described below, the user identification is omitted from the certificate.) The initial manufacturer-issued certificate is provided as assurance that the user has a tamper-resistant device. The initial certificate uses a very short expiration term and does not include a user ID, just a wallet ID. The user is expected to re-certify shortly after getting the electronic wallet.

During certification, the electronic wallet 58 is connected to the bank's computer 62. This connection can be achieved, for example, using a direct connection, or alternatively over a public network (e.g., the Internet).

The electronic wallet 58 has a cryptographic program stored in the program memory that directs the processor to perform cryptographic functions, such as key generation and management, encryption, decryption, signing, and verification. During certification, the electronic wallet 58 generates a unique pair of public and private cryptographic signing keys, and submits the key pair along with user identification to the bank's computer 62. The initial certificate stored by the manufacturer is also submitted and used to create the secure channel for this first communication. The materials are forwarded in a packet 64.

The bank's computer 62 examines the packet 64 and compares the initial manufacturer-issued certificate to a list of initial certificates to ensure that the wallet is a tamper-resistant device. The bank's computer also compares the manufacturer-issued certificate to the hot list of bad wallets to ensure that the wallet is not a bad wallet. If the certificate checks out cleanly, the bank's computer 62 confirms the identity of the user. If the user is present, the identification confirmation is performed using traditional methods, such as driver's license, finger prints, and so on. If the user is not present and the certification is handled remotely, the bank relies on other evidence such as a phone number, address, mother's maiden name, and so on. Following successful confirmation, the bank's computer 62 digitally signs the packet to produce a certificate 66. An expiration date is attached to the certificate and the certificate is returned to the electronic wallet 58.

With reference again to FIG. 3, the user of the k-off wallet 58 initiates the withdrawal transaction by establishing a secure communication channel 68 between the wallet 58 and the bank's computer 62. This is done through an exchange of certificates, whereby the electronic wallet 58 verifies the authenticity of the bank's computer 62 (and software operating thereon) by virtue of the bank's certificate; and conversely, the bank's computer 62 verifies the authenticity of the electronic wallet from the wallet's certificate. The same process is initiated by the 1-off wallet 56 to establish a secure communication channel 70. The processes of exchanging certificates, verifying parties, and encrypting communication are performed using conventional techniques.

With the secured channels 68, 70 established, the users request withdrawal of electronic cash. Suppose each user wants to withdraw $100 in units of $1 coins. The bank's computer 62 has coin issuing software executing thereon which utilizes a random number generator to create a nonce (i.e., a fresh string of data) representative of each transferable coin. The bank's computer then attaches a serial number and an expiration date. The entire data string might be 550–1000 bits long, in which 400 bits are random, 50 bits constitute a serial number, 50 bits constitute an expiration date, and 50 bits are a string of zero bits. Using a hashing function, the bank's computer 62 computes a cryptographic digest or "hash" of the data string. A hash function is a mathematical function that converts an input data stream into a fixed-size, output data stream that is representative of the input data stream. The bank's computer 62 is programmed to digitally sign the cryptographic digest (hash) by operating with the bank's private signing key for the $1 denomination to create a $1 coin. The bank's computer employs a different pair of signing keys for each denomination. Accordingly, a $1 digital coin is created as follows:

$$S_{K.\$1.sign.pri.bank}(\text{Digest}) = \$1 \text{ Coin} = T_0$$

where "$S_{K.\$1.sign.pri.bank}$" is a signing function using the bank's private $1 signing key. As an alternative, the bank's computer may generate a stick of one hundred $1 coins and digitally sign the stick, as opposed to each individual stick. The minting stick process is described above.

The coins, or stick of coins, are downloaded to the electronic wallets 56, 58 over respective secure communication channel 70, 68. The bank debits the user's account for the amount of money withdrawn. The coins are stored in the electronic wallets 56, 58. The user is free to carry the electronic wallet and use it wherever he/she wishes.

For purposes of continuing discussion, suppose the owner of the k-off electronic wallet 58 decides to buy a $1 item or service from another user having a k-off electronic wallet 72. In this transaction, the paying electronic wallet 58 is the payer wallet and the receiving electronic wallet 72 is the payee wallet. The payer wallet 58 initiates communication with the payee wallet 72 and establishes a secure communication channel 74 in the manner described above. Upon purchase, the payer wallet 58 transfers the a $1 coin by concatenating the previous version the coin $T_0$ with a signed representation of that previous version in the manner described above. Accordingly, $$T_1 = T_0, S_{Kpayerwallet58}[\text{Hash}(\text{payer wallet ID}, T_0, t_0, \text{payee wallet ID})]$$

where "$S_{Kpayerwallet58}$" is a signing function using the payer wallet's private signing key and "Hash" is a one-way hashing function of the concatenation of the payee wallet ID, the coin as it is received from the bank $T_0$, the time of the transfer $t_0$, and the payer wallet ID.

The signed coin is tendered to the payee wallet 72. The payee wallet 72 runs software which evaluates the proffered coin by checking the signatures of both the bank and the payer electronic wallet. The wallet signature is checked against a local list of bad wallets to ensure that the wallet is not bad and has not been revoked. The coin itself is evaluated to ensure that it has not expired, has not been transferred more times than permitted by the system, and that a hash of the coin does not match a hash of another non-expired coin stored on the payee wallet (i.e., no local collision). If the evaluation is positive, the payee wallet 72 accepts the $1 coin in exchange for the purchased item or service. To summarize the acceptance rules, a payee wallet may accept payment if the following conditions hold:

1. The payer wallet is not a bad wallet.
2. The chain of transactions has the property that the payee of $T_i$ matches the payer of $T_{i+1}$ for all $1 \leq i \leq k$.
3. The coin has not expired.
4. There is no local collision.
5. The coin has been transferred less than or equal to k times for a k-off system.

Any transaction for which these conditions hold is called "Proper." It is noted that a proper transaction may be fraudulent.

Now, suppose the electronic wallet 72 desires to transfer the same $1 coin to another type of electronic asset holder, designated as 76. In this example, the asset holder is a computer which is representative of a kiosk machine at a merchant, an banking ATM machine, or a desktop computer at a business. The computer wallet 72 has tamper resistant safeguards, such as, physical protection that prevents entry by force and special coating to protect sensitive elements against radiation attacks. The electronic wallet 72 establishes a secure communication link 78 and transfers the $1 coin (signing it before transfer) in the manner described above. In a similar manner, the 1-off wallet 56 transfers a coin over a secure communication link 80 to the computer 76.

Periodically, the computer 76 batch deposits all of the received coins to the bank 52. Typically, the deposit bank is different than the issuing bank, but for discussion purposes, the issuing bank is also the collecting bank. Settlement between issuing bank and collecting bank is beyond the scope of this patent. To deposit the received coins, the computer 76 establishes a secure communication channel 78 with the bank's computer 62. The spent coins are downloaded over the secure channel 82 to the bank's computer 62. The spent coins may have been transferred the maximum number of times, or less than the maximum number of times. The bank stores all of the exhausted coins in a large database 84, which is expected to be initially at least ten gigabytes, and maybe as much as twenty or more gigabytes, for an individual bank. If banks decide to rely only on the probabilistic audit, these numbers can go down by a few orders of magnitude.

The bank's computer can then, if desired, perform a comprehensive fraud evaluation check to determine if any of the coins in the huge database 84 has been double spent. However, this deterministic "after the fact" process is a large task, requiring substantial processing capabilities. The bank may forego the deterministic evaluation in favor of only performing the statistical evaluation, described below.

As part of the probabilistic fraud detection scheme, the k-off wallets 58, 72, and 76 periodically submit the received coins over a network 86, such as a public network like the Internet, to a fraud detection center (FDC) 90. The communication channels through the network 86 are secured. Additionally, other forms of networks may be used, such as telephone, RF, cable, and the like.

The coins are submitted in response to a routine audit request that is periodically broadcast by the fraud detection center 90. More particularly, the FDC computer broadcasts an unforgeable random number "r" in periodic intervals (e.g., every five seconds) over a network to the k-off electronic wallets 58, 72, and 76. The broadcast transmission can be conducted over the same network 86 as the coins were received, or over a separate network, such as a wireless network represented by RF tower 98. Preferably, the wireless network is implemented as a paging network which permits convenient and reliable downlinking of data from the FDC to the payee wallets. Other types of distribution networks may also be used, such as cable TV or interactive television systems, cellular phone, telephone lines, satellite systems, and the like.

Every payee wallet that was active during the last five second audit interval sends for audit by the FDC 90 every transferred coin T, such that a hash of the signed transaction is equal to the random number r (i.e., $\text{Hash}[S_{payee}(T)]=r$). Although each transferred coin is subject to an audit by the fraud detection center, not all submitted coins are in fact audited. Instead, only a sample of the transferred coins are audited. The sample is a small fraction, but statistical representative, of the large number of coins being transferred among the wallets. The payee wallet also sends to the fraud detection center 90 all un-deposited transactions in which any newly revoked payer is involved. For transactions that are to be audited by the FDC computer 92, the k-off wallet is designed to delay the completion of the transaction until it receives the results of the audit during the next scheduled broadcast (e.g., five seconds).

Figure 5:
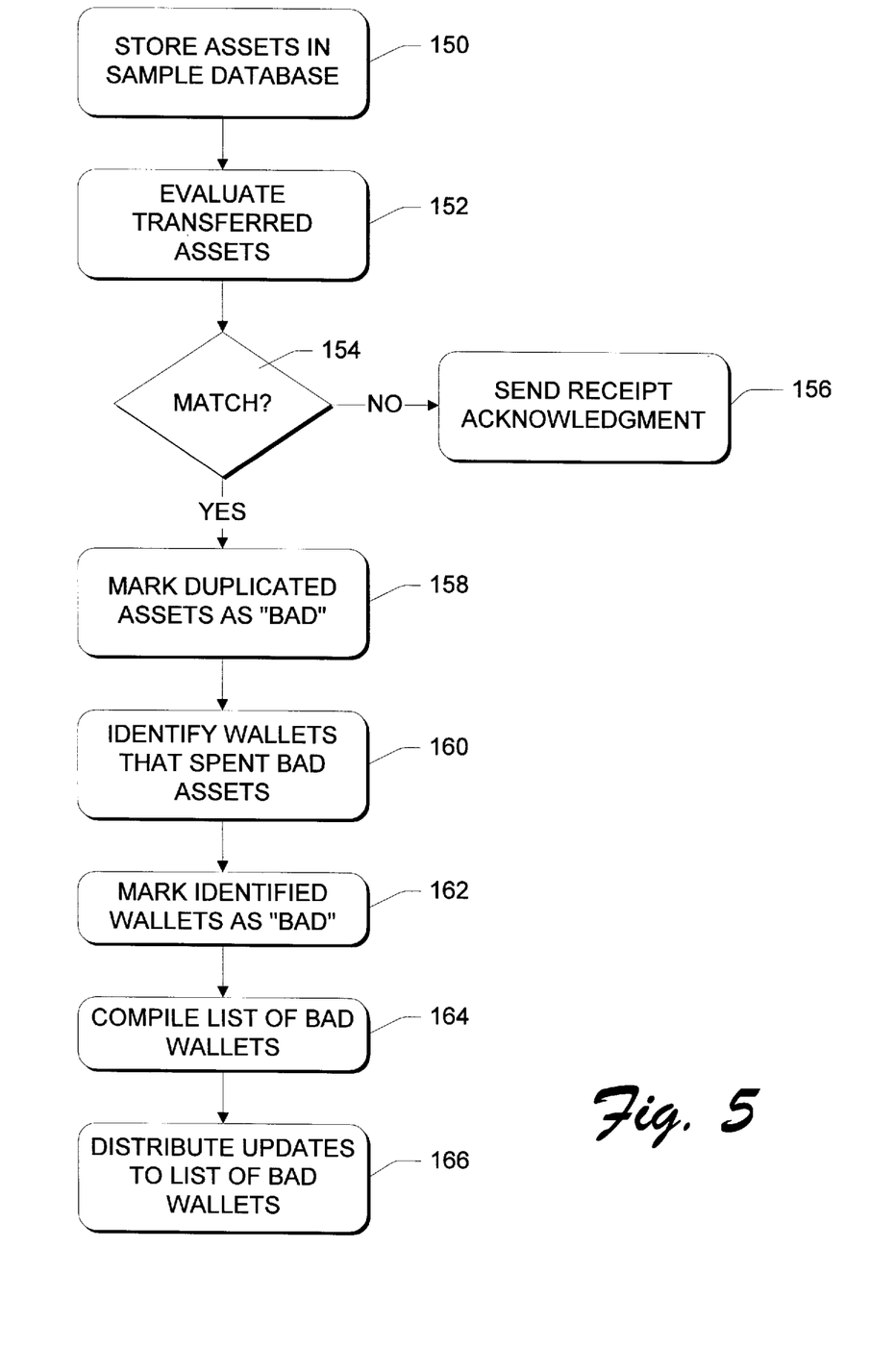
FIG. 5 is a flow diagram of steps in a computer-implemented method for detecting fraudulent transactions according to an aspect of this invention.

The fraud detection center 90 has a computer 92 which is programmed to perform the steps shown in FIG. 5. The computer 92 receives the coins from the various payee wallets and stores the coins, or a representative sample of them, in a sample database 94 (step 150 in FIG. 5). The FDC computer 92 is programmed to evaluate the transferred coins in the sample database 94 to detect if any of them have been used in a fraudulent manner (step 152 in FIG. 5). In particular, a software program executing on the FDC computer 92 performs determines whether two or more chains have a common or matching root transaction (step 154 in FIG. 5). This fraud detection criteria is discussed above and depicted in FIG. 2. The fraud evaluation can be performed as each newly transferred asset is received from a payee wallet. If no match is found (i.e., the "no" branch from step 154), the FDC computer 92 will return a positive receipt (step 156 in FIG. 4). Conversely, if a match is found (i.e., the "yes" branch from step 154), the computer program marks the duplicated coins as "bad" coins (step 158 in FIG. 5).

The FDC computer 92 traces through the transaction chain of each bad coin to find the signature of the payer wallet which transferred the same coin multiple times. The FDC computer 92 uses the signature to identify the certificate issued to the payer electronic wallet that double spent the coin (step 160 in FIG. 5). The suspect wallet is then labeled as being a "bad" wallet (step 162 in FIG. 5). It is noted that the software running on the FDC computer 92, as well as the software executing on the bank and merchant computers, are loaded from computer-readable memory (e.g., a floppy disk, optical disk, or hard disk) and executed by processing units in the computers.

The coin analysis might reveal multiple bad wallets. Accordingly, the FDC computer 92 compiles a list 96 in an electronically readable data structure that contains all of the bad wallets (step 164 in FIG. 5), or more specifically, all of the certificates of the bad wallets. The FDC computer 92 then broadcasts the updates to the list of bad wallets over the network 86 or wireless network 98 (step 166 in FIG. 5). Additionally, the entire list 96 can also be posted at a publicly accessible location for anybody to access and download, such as an Internet web site. The list is also sent to the bank 52 via a secure communication channel 100.

Along with the list 96, the fraud detection center 90 sends signed receipts indicating positive or negative results to the audit (with positive result meaning that the payer wallet is using the coin properly, and a negative result meaning that the payer wallet or a predecessor in the chain is attempting to fraudulently use the coin). The fraud detection center 90 also sends acknowledgments of any revocations. The fraud detection center 90 provides this information in a 30 Kbyte broadcast package that is broadcast periodically, such as every five seconds. For broadcasting efficiency, the hot list and audit results for the previous audit interval are sent together with the random number r for initiating the next audit interval as part of the 30 Kbyte package.

The k-off wallets 58, 72, and 76 are equipped with an appropriate receiver to receive the list 96 from the fraud detection center 90 as well as the audit command, r. The receivers might be an RF receiver to receive radio, cellular, and paging signals; or a network card to receive data over a network; or a modem to receive data over a phone line; or a satellite receiver to receive satellite packets. The local hot lists provide the k-off wallets with ready, on-the-spot identification of bad wallets. Any transaction that was delayed typically one audit interval is permitted to conclude if the audit results are positive.

Every k-off wallet contains mechanisms that enforces compliance with the audit and revocation policies. For audit compliance, each k-off wallet has a delayed shutoff until next audit, as described above. If it has transactions that need to be audited, their completion is delayed until a positive unforgeable receipt is received from the FDC computer. All other transactions may conclude. Negative receipt from the FDC computer implies payer-revocation, and those transactions are canceled. When audited transactions cannot complete the wallet is stuck with the last transaction stored inside.

For revocation compliance, when a payee wallet receives an updated revocation list from the fraud detection center, the payee wallet checks to see if it has been involved with any of the new payer wallets added to the list as bad wallets. If it has, the payee wallet sends all undeposited transactions involving the bad payer wallet to the fraud detection center before the payee wallet can proceed with any further transactions.

Accordingly, the local hot list of bad wallets assist the electronic wallets 58, 72, and 76 in evaluating all subsequently tendered coins to determine whether they are from a bad wallet. If so, the payee wallet will refuse the transaction and cease communication with the bad wallet. Additionally, law-enforcement agencies can masquerade as payee wallets to perform sting operations aimed at ferreting out bad payer wallets.

The bank 52 may continue to perform deterministic evaluation on all coins stored in the exhausted asset database 84 to absolutely detect fraud. In this case, the fraud detection center functions as an early warning system that operates quickly to detect fraud from the small sample and warn others of bad wallets. This early warning detection supplements the banks deterministic evaluation. On the other hand, the bank may decide that the probabilistic evaluation performed by the fraud detection center is satisfactory and eliminate the database 84 altogether.

A payee wallet 58, 72, and 76 may receive bad coins, knowingly or innocently, over time. The certificates of k-off wallets include a count of the number of bad coins that the corresponding wallet have received. A bad credit limit is set as a maximum number of bad coins that can be received by a single wallet. In the event that the number of bad coins exceeds the bad credit limit, the wallet is revoked.

Each k-off wallet 58, 72, 76, inclusive of the bad wallets, must periodically renew their certification before the expiration date of the certificate. Example expiration terms can be one month to one year. The renewal process is similar to the original certification process explained above with respect of FIG. 3, but further includes the electronic wallet's obligation to submit the old certificate with public and private keys. The certifying authority (or bank in this case), examines the old certificate in view of the hot list of bad wallets. If listed, the bank refuses the transaction, and might even be able to identify the user 54. In addition, the certifying authority checks the number of bad coins contained in the wallet and revokes the wallet if it exceeds the bad credit limit. Receipt of all coins are reimbursed. But when a wallet accumulates bad coins above some threshold, t, it is revoked and the cost of the wallet, $C_b$ is not reimbursed. If $C_b$=t this is akin to present day practice where a holder of counterfeit coins is not reimbursed for the amount, even though the holder received the coins legitimately and innocently. Notice that in the above arrangement, a user does not suffer twice for the loss.

Various revocation and reimbursement policies may be implemented. One example policy is as follows:

1. A payer wallet is revoked when caught multi-spending.
2. A payment completed after the payer has been revoked is not reimbursed to the payee.
3. A payee wallet having a bad coin count that exceeds the bad credit limit is revoked. A proper balance is reimbursed, but the cost of the wallet is not reimbursed. The newly issued wallet is initialized with a bad coin count of zero.
4. The cost of a lost, stolen or damaged wallet is not reimbursed.
5. All other proper complete transactions are reimbursed.

After the revocation and reimbursement policies are considered, the bank issues a new certificate for a new expiration term. A shorter expiration term requires that the electronic wallets are re-certified more regularly. This, in turn, exposes bad wallets more often, before they can promulgate fraud to any large extent. However, too short of term might be administratively bothersome because the user is continuously updating the wallet's certificates. Accordingly, expiration terms are set according to the environment of use, while taking into consideration these competing goals.

The combination of compiling lists of bad wallet certificates (and not bad coins) and using relatively short expiration terms, the hot list of bad wallets can be kept fairly short. In this manner, the list can be conveniently stored on the wallets themselves, which often have memory capacity limitations. The wallets can perform routine cleanup procedures to remove wallets with expired certificates from the hot list to maintain a short list.

Anonymous Electronic Asset System

The anonymous electronic asset system differs from the above described non-anonymous system in two notable ways. First, the certificates issued to the electronic wallets are blindly signed by the certifying authority (or bank, in this example) so that the identity of the wallet is not known to the certifying authority. Second, the withdrawn coins are blindly signed by the bank so that the identity of the deposited coin, and the payer's wallet are not known to the bank. A "blind signature" is the electronic kin of signing an envelop containing a document and a carbon copy. The signature is pressed through the envelop and appears on the document, but the signer has no idea what it is signing. Only the recipient can extract the signed message from the envelop. Blind signatures are described in greater detail in the Schneier book identified at the beginning of Detailed Description Section.

In the non-anonymous system, the bank knew the identity of the user when the user withdrew money. During re-certification, the user is given a new certificate with a new expiration period, but usually may carry the same old public key. Each valid user has only one certificate at any one time. To move away from a non-anonymous system, the payer's identity must be hidden from the bank. However, even if the bank blindly signed issued coins, the bank would still eventually see the spent assets and identify the certificate via the attached signature. One approach is to employ a combination of blinded signatures and separate keys for withdrawal and payment. In this manner, the bank cannot associate withdrawal with payment. However, there is a possibility that a detectable shopping pattern might emerge based upon use of the payment key pair, which effectively exposes the user's identity.

Accordingly, to ensure true anonymity, the electronic asset system 50 enables the users 54 to break at will any linkability between withdrawal and payment, and between different payments, so that the transactions cannot be traced to the user. Breaking linkability is provided through the issuance of payment certificate(s) and separate withdrawal certificate(s) and the ability for the electronic wallet to change its payment certificate anonymously whenever the users 54 decide. None of the payment certificates are linkable to each other, nor to the withdrawal certificates. In this manner, the user can withdraw coins using one wallet certificate and identification, and then pay with another wallet certificate which can be changed at will.

Figure 6:
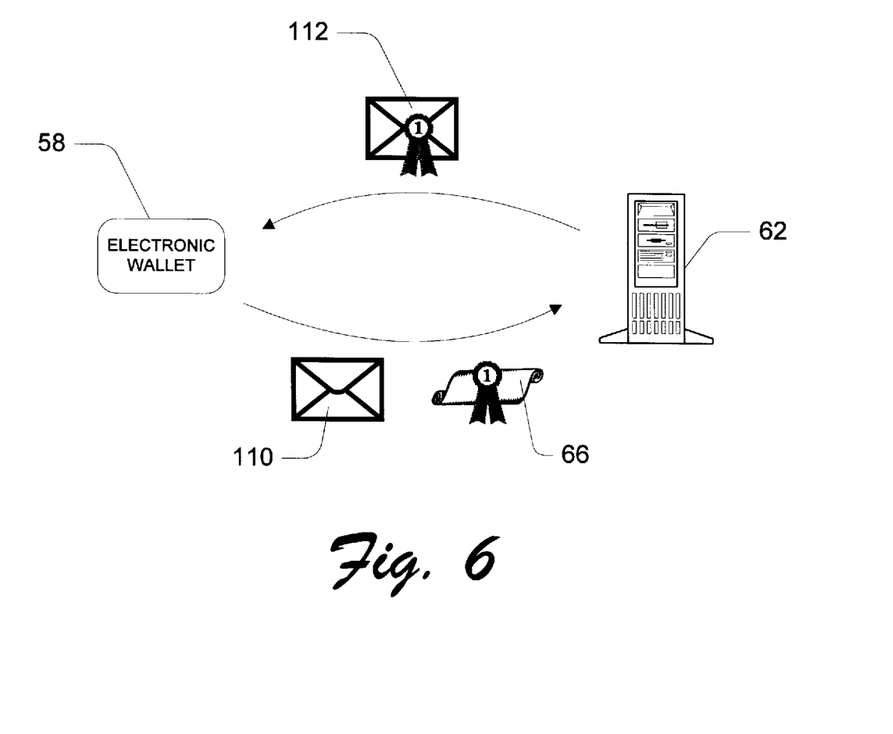
FIG. 6 is a diagrammatic illustration of a certification and withdrawal process in an electronic asset system which is implemented with anonymity.

FIG. 6 shows a blind re-certification process in more detail. For this illustration, suppose that the k-off electronic wallet 58 has already received its initial payment certificate from the bank's computer 62 as described above with reference to FIG. 4. Now, the user desires to change the identity of the electronic wallet by refreshing the payment certificate. The user's electronic wallet 58 connects to the bank's computer 62 and establishes a secure channel using the present pair of keys. The electronic wallet 58 sends its present payment certificate 66, along with a new pair of public and private cryptographic signing keys and a new expiration date enclosed in an "envelop" 110. The k-off wallet's certificate 58 also includes as part of the information in envelop 110 its accumulated bad credit count at the time the certificate was issued, designated as "$BC_A$."

Suppose M represents the message contents to be sent to the bank, and the electronic wallet 58 has an RSA public key (e, N). Putting M in the "envelop" 110 means creating ($X^e M$ mod N), where x is a secret value known only by the wallet. The new expiration date has a relatively short expiration term (e.g., one month).

The bank's computer 62 evaluates the present payment certificate 66, namely the secret signing key contained therein, to ensure that it is valid and not revoked or expired. The bank's computer 62 also checks the bad coin count to see if it surpasses the preset bad credit limit. If the certificate 66 is not valid or the bad coin count exceeds the bad credit limit, the bank refuses to sign the envelop 110. On the other hand, if the certificate 66 is valid and the bad coin count $BC_A$ does not exceed the bad credit limit, the bank's computer 62 agrees to blindly sign the envelop 110 by raising the value ($X^e M$ mod N) to the power of d mod N to produce a result ($xM^d$ mod N ). Only the user who initiated this protocol (and therefore knows the secret x) can recover $M^d = x\ M^d/x$ mod N which is the new certificate 112.

The bank's computer 66 also uses a technology known as "zero knowledge proof" which permits the bank to ensure that the new certificate 112 contains a new bad coin count $BC_N$ that is equal to the accumulated bad coin count $BC_A$ without learning the identity of the withdrawing customer. By ensuring that $BC_N = BC_A$, a wallet is precluded from accumulating multiple bad coins (e.g., a few less than the limit) and then obtaining a fresh certificate with a new bad credit balance of zero. Zero knowledge proof is known in the art, and will not be described here. For more information on zero knowledge proof, the reader is directed to U.S. Pat. No. 5,511,121 and to a book entitled "Handbook of Theoretical Computer Science," Vol. A, MIT Press, 1990. J. Van Leeuwen Ed., pg. 744. These references are hereby incorporated by reference.

The bank's computer returns the blindly signed payment certificate 112 to the electronic wallet 58. The electronic wallet is the only entity to know the secret x and thus, divides by x to "open the envelop" and obtain the unblinded signature ($M^d$ mod N).

The bank is unable to verify the correctness of the new expiration date. However, this expiration date is eventually revealed to a payee wallet. If the expiration date exceeds the appropriate term (say more than one month), the payee wallet reports the payer wallet to the fraud detection center 90 which lists the wallet as bad and revokes its public key. Accordingly, the electronic wallet 58 cannot cheat by asking the bank to blindly sign a certificate with longer expiration.

The withdrawal certificate(s) can be anonymous or non-anonymous. An anonymous certificate is appropriate when exchanging ordinary cash for electronic cash, or when exchanging old electronic cash for new electronic cash. An anonymous withdrawal certificate is refreshed using the blind approach described above with respect to FIG. 6. A non-anonymous withdrawal certificate is used when depositing assets, and can be refreshed using the non-anonymous approach described above with respect to FIG. 4.

With reference to FIG. 3, the wallet 76 is shown withdrawing assets with the bank 52. The k-off wallet 76 establishes a secure channel 78 with the bank's computer 62 and submits candidate coins and specifies their desired value and expiration dates. The bank assigns the value by choosing a signature exponent corresponding to that value. In the case of withdrawal, the authorized value equals the desired value if the user has sufficient funding in his/her account. The bank's computer blindly signs the coins and return them to the electronic wallet 58. If unused before the expiration date, the unexpired coin is refreshed by submitting it in exchange for a new coin of equal value with a new expiration date.

In the anonymous system, the fraud detection center 90 is still able to detect fraudulently used coins by examining for matching roots on the coins' signature trees. From the bad coins, the fraud detection center 90 can determine which wallet spent the coin using the signature attached to the spent coin. This bad wallet can then be added to the list that is broadcast to all wallets.

The anonymous system has one potential weakness for attack. A pirate could multispend the same coin and thereafter re-certify the electronic wallet to change its identity before the current wallet is listed as bad and the current signing key is revoked. To prevent this scenario, a dead time interval is defined for handling requests for new certificates.

The specific time interval can be scheduled during low traffic times, such as at midnight. Before this dead time interval, the bank handles all transactions for the day and allows all batch deposits to clear. Requests for new certificates can likewise come anytime before the dead time interval. During the interval, however, no more deposits or requests are permitted and all new certificate requests are postponed until after the interval is completed. The length of the dead time interval is such that even if all deposits and requests come at the last available second, all processing can terminate during the interval. After the dead time interval, the new certificates are sent to users and the bank's computer begins processing new deposits and certificate requests. In this manner, the bank's computer is not re-certifying bad wallets until the bank has processed all coins and (deterministically) detected any bad wallets. This ensures detection of bad wallets before they are re-certified.

The dead time interval is expected to be less than one minute. Suppose that 25 million people in United States use electronic wallets, while banking at one thousand different banks. This averages to twenty-five thousand users per bank. Next, suppose that each user deposits 40 coins per day. At this rate, each bank must verify one million signatures per day. A present-day DSP (digital signal processing) chip can perform approximately 50 thousand 500-bit Rabin verifications per second. So, one DSP chip can verify one million signatures in 20 seconds (1,000,000/50,000=20). This time can be shortened by running multiple DSP chips in parallel.

Accordingly, the anonymous electronic asset system 50 stipulates two rules to prevent multispenders from re-certifying: (1) every recipient deposits all received coins on a routine basis (e.g., daily), and (2) requests for new certificates are handled anytime before and during the pre-defined dead time interval, however, new certificates are only issued after the time interval has elapsed.

Another potential scenario concerns a pirate who discovers that some merchant deposits coins daily at 3:00 PM. The pirate thus double spends coins beginning at 4:00 PM and later requests a new certification of his wallet before midnight. This process is repeated daily. This scenario would not permit the pirate to profit for long, however, because the fraud detection center 90 would detect the activity and end it before the pirate could break even. While the wallet can change identity, the coins themselves cannot. Accordingly, there is no need to catch a wallet before it changes its identity, just eventually before the pirate can break even with the initial investment of cloning the wallet in the first place.

The certification guidelines for both the anonymous and non-anonymous systems are summarized below:

1. Each electronic wallet is born with a pair of public/private keys, and a corresponding certificate, which are known and listed by a certification authority (CA). This is true both for anonymous and non-anonymous systems.
2. For non-anonymous systems at expiration, each user gets automatically a new certification, which usually includes the same old public key with a new expiration (unless the user asks to replace the public key for fear that it has been exposed). At each moment, each valid user has exactly one certificate.
3. For anonymous system, at each moment, each valid user has exactly one valid payment certificate and one valid withdrawal certificate. These certificates are distinguishable.

The payment certificate is issued using the blind certificate technique of FIG. 6. A user replaces the initial certificate with an anonymous payment certificate. The initial certificate has a very short expiration, and then periodically, or as needed (but not exceeding an upper bound on expiration) uses the blinded certificate protocol to refresh it. The blinded certificate protocol is done with new fresh public keys. The bad asset count is maintained through the re-certification process.

The withdrawal/deposit certificate may be issued anonymously, in which case this is done the same way as with payment certificate. Alternatively, it might be issued non-anonymously, in which case procedure 2 is used. The former is used when exchanging ordinary cash for e-cash, or when exchanging old e-cash (that the user received as payee) for fresh e-cash. The later is used when depositing.

In the case of anonymous system, none of the payment certificates are linkable to each other nor to the withdrawal certificates, and the two kinds of withdrawal certificates are not linkable to each other.

It can be statistically shown that for cloning costs of $10,000 per wallet, assuming only $1 transaction, a sampling rate of one in one hundred transactions will detect forgeries with probability close to one by the time the adversary break-even. The sampling approach is advantageous in that it does not depend on whether fraud is committed in large quantities in a short time period, or in a trickle over a long time period. The sampling rate depends on the break even cost to the pirate. A sampling rate can always be set to a conservative estimate of the cost required to clone a wallet. These costs vary over time due to technology advances and thus the sampling rates are modifiable to compensate for these cost variations. Additionally, as time goes on, cloning costs are amortized over more wallets, thereby reducing cost per wallet. The sampling rate is increased to maintain constant detection probability, until the rate is too high and new tamper-resistant technology is deployed. Although the average sampling rate depends only on breaking cost of a wallet, it may be needed to react to "bursty" attacks using bursty sampling strategy. Otherwise the adversary may be able to exceed break-even (because detection will happen too late).

The fraud detection and early warning system thus uses a small sampling of the transactions to detect fraud and eliminate it before the criminal can make good on his/her initial cloning investment. The sampling process requires tremendously less resources to operate and maintain in comparison to a full online deterministic fraud detection system. With appropriate sampling parameters, the fraud detection system can sniff out fraudulent activity with high probability (i.e., 95% or better). The banks may decide to currently perform massive evaluation of all coins that are exhausted to absolutely detect fraud. However, this requires substantial storage and processing cost, as well as maintenance expenses. The banks may thus conclude that probabilistic fraud detection is satisfactory and eliminate storage and processing of all exhausted coins.

The above disclosure centered on an electronic asset system. However, it is noted that some aspects of this invention can be used generally in a public key cryptography system. In the more general case, electronic devices are assigned certificates with public and private key pairs. The devices then engage in transactions according to a set of prescribed rules which typically involves digital signing using the private signing key. This certificate is marked as revoked. The sample and detection system then compiles a list of revoked certificates which is broadcast to all of the payee electronic devices over a paging network, or the like. By using short expirations and storing short hashes of the revoked certificates, the list is short enough to be stored locally on the electronic devices. These local lists are then used to prevent further perpetuation of non-compliance with the rules.

In compliance with the patent statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

I claim:

1. An electronic asset system comprising:
   a plurality of electronic wallets;
   a plurality of transferable electronic assets stored on the electronic wallets, the electronic assets being transferred from payer electronic wallets to payee electronic wallets during transactions; and
   a fraud detection system to sample a subset of the transferred electronic assets to detect bad assets that have been used in a fraudulent manner, the fraud detection system further identifying the payer electronic wallets that transferred the bad assets.

2. An electronic asset system as recited in claim 1, wherein the electronic wallets are tamper-resistant.

3. An electronic asset system as recited in claim 1, wherein the transferable electronic assets contain identification of all payer electronic wallets that have transferred the electronic assets.

4. An electronic asset system as recited in claim 1, wherein the payer electronic wallets digitally sign the electronic assets when transferred.

5. An electronic asset system as recited in claim 1, wherein each electronic wallet stores a representation of every electronic asset that the electronic wallet receives until the representation expires.

6. An electronic asset system as recited in claim 1, wherein during a transfer of a particular electronic asset from a particular payer electronic wallet to a particular payee electronic wallet, the payer electronic wallet generates a new version of the electronic asset, $T_{new}$, for transfer to the payee electronic wallet, the new version $T_{new}$ being a concatenation of a previous version of the electronic asset, $T_{old}$, originally received by the payer electronic wallet and a signed representation of the previous version $T_{old}$.

7. An electronic asset system as recited in claim 6, wherein the new version of the electronic asset is as follows:

$$T_{new}=T_{old}, S_{Kpayer}[\text{Hash}(\text{Payer ID}, T_{old}, \text{time}, \text{Payee ID})]$$

wherein "$S_{Kpayer}$" is a signing function using a cryptographic key of the payer electronic wallet and "Hash" is a hashing function used to compute a hash digest of data including an identification of the payer electronic wallet ("Payer ID"), the previous version of the electronic asset $T_{old}$, a time of the transfer ("time"), and an identification of the payee electronic wallet ("Payee ID").

8. An electronic asset system as recited in claim 1, wherein the electronic wallets comprise a transmitter to transmit the transferred electronic assets over a network to the fraud detection system.

9. An electronic asset system as recited in claim 1, wherein the fraud detection system compiles a list of the payer electronic wallets identified as transferring bad assets.

10. An electronic asset system as recited in claim 9, wherein the fraud detection system distributes the list of the payer electronic wallets identified as transferring bad assets to warn other electronic wallets.

11. An electronic asset system as recited in claim 9, wherein the list of the payer electronic wallets identified as transferring bad assets is stored on the electronic wallets.

12. An electronic asset system as recited in claim 9, wherein the fraud detection system transmits the list over a network.

13. An electronic asset system as recited in claim 12, wherein the payee electronic wallets are equipped with a receiver to receive transmission of the list.

14. An electronic asset system as recited in claim 1, wherein the fraud detection system compares a newly transferred asset to the assets in the sampled subset to determine whether the newly transferred asset has been transferred from a single payer electronic wallet to multiple payee electronic wallet, the multiple transfers being indicative of fraudulent use on part of the payer electronic wallet.

15. An electronic asset system as recited in claim 1, wherein:
   the electronic wallets are associated with particular users and are traceable to those users; and
   the fraud detection system further identifies the users associated with the payer electronic wallets that have been identified as transferring the bad assets.

16. An electronic asset system as recited in claim 1, wherein the electronic wallets are issued with temporary certificates that expire on an expiration date.

17. An electronic asset system as recited in claim 1, wherein the payee electronic wallets accumulate the bad assets and when the bad assets on a particular payee electronic wallet reach a bad credit limit, the fraud detection system revokes the particular payee electronic wallet.

18. An early detection and warning system for detecting fraudulent transactions involving transferable electronic assets, individual electronic assets being transferable from a payer electronic wallet to a payee electronic wallet during a transaction, the early detection and warning system comprising:
   a sample database; and
   a computer programmed to perform the following steps:
      store a sample of transferred electronic assets in the sample database;
      mark an electronic asset as a bad electronic asset in an event that the electronic asset has been transferred from a single payer wallet to multiple payee wallets; and identify the payer electronic wallet from which the electronic asset was transferred multiple times as a bad wallet.

19. An early detection and warning system as recited in claim 18, wherein the computer is further programmed to compare the electronic asset with the transferred electronic assets stored in the sample database to discover whether the electronic asset was transferred from the single payer wallet to the multiple payee wallets.

20. An early detection and warning system as recited in claim 18, wherein the computer is further programmed to compile a list of bad wallets.

21. An early detection and warning system as recited in claim 18, further comprising a network connection to an electronic data network, the computer being further programmed to transmit an identity of the bad wallet via the network connection over the electronic data network.

22. An early detection and warning system as recited in claim 18, further comprising a transmitter to broadcast an identity of the bad wallet over a broadcast communication network.

23. An electronic fraud detection system for detecting fraudulent transactions involving electronic assets, the electronic fraud detection system comprising:
   an asset issuing unit to issue transferable electronic assets to asset holders, the electronic assets being subsequently transferred from payer asset holders to payee asset holders; and
   a fraud sampling unit to evaluate a sampled subset of the electronic assets received by the payee asset holders to detect if the electronic assets have been used in a fraudulent manner.

24. An electronic fraud detection system as recited in claim 23, wherein the issuing unit issues a stick of multiple electronic assets that is digitally signed once by the issuing unit, the asset holders being able to transfer individual ones of the electronic assets to distinct payee asset holders from the stick without transferring the stick as a whole.

25. An electronic fraud detection system as recited in claim 23, wherein the fraud sampling unit identifies the asset holders responsible for fraudulent use of the electronic assets and compiles a list of the identified asset holders.

26. An electronic fraud detection system as recited in claim 25, wherein the fraud sampling unit distributes the list of the asset holders to warn that the identified asset holders have used electronic assets in a fraudulent manner.

27. An electronic fraud detection system as recited in claim 23, wherein the fraud sampling unit evaluates each sampled transferred electronic asset to determine whether the transferred electronic asset has been transferred multiple times from a single asset holder.

28. An electronic fraud detection system as recited in claim 23, wherein:
   the asset holders are associated with particular users and are traceable to those users; and
   the fraud sampling unit identifies the users associated with the asset holders that are identified as responsible for fraudulent use of the electronic assets.

29. An electronic fraud detection system as recited in claim 23, wherein:
   the certificates of asset holders are configured to expire on an expiration date; and
   the asset issuing unit issues a new expiration date to an expiring asset holder to permit the asset holder to continue operation after the expiration date.

30. An electronic fraud detection system as recited in claim 29, wherein the asset issuing unit issues the new expiration date for the asset holders' certificates during a time period in which the asset issuing unit is not issuing electronic assets.

31. An electronic fraud detection system as recited in claim 23, wherein the certificates of the asset holders accumulate the count of fraudulently used electronic assets and the fraud sampling unit revokes the asset holders when a number of fraudulently used electronic assets exceeds a bad credit limit.

32. An electronic asset system, comprising:
   an asset issuing unit to issue transferable electronic assets, the electronic assets being digitally signed by the asset issuing unit;
   a plurality of asset holders to store the signed electronic assets, each asset holder having an identification certificate containing a cryptographic public key, the certificate being digitally signed by a certifying authority, the asset holders including payer asset holders and payee asset holders wherein the payer asset holders use their corresponding signing keys to digitally sign the electronic assets when the electronic assets are transferred to the payee asset holders;
   a fraud sampling unit to evaluate a sampled subset of the electronic assets received by the payee asset holders to detect if the electronic assets have been used in a fraudulent manner, and in an event of detection, the fraud sampling unit using the payer asset holders' signatures on the fraudulently used electronic assets to identify bad payer asset holders that are responsible for the fraudulent use from among said plurality of asset holders; and
   the fraud sampling unit being configured to compile a list of the bad payer asset holders.

33. An electronic asset system as recited in claim 32, wherein during a transfer of a particular electronic asset from a particular payer asset holder to a particular payee asset holder, the payer asset holder generates a new version of the electronic asset, $T_{new}$, for transfer to the payee asset holder, the new version $T_{new}$ being a concatenation of a previous version of the electronic asset, $T_{old}$, originally received by the payer asset holder and a digitally signed representation of the previous version $T_{old}$ using the cryptographic signing key of the payer asset holder.

34. An electronic asset system as recited in claim 33, wherein the new version of the electronic asset is as follows:

$$T_{new} = T_{old}, S_{Kpayer}[\text{Hash}(\text{Payer ID}, T_{old}, \text{time}, \text{Payee ID})]$$

wherein "$S_{Kpayer}$" is a signing function using the cryptographic signing key of the payer asset holder and "Hash" is a hashing function used to compute a hash digest of data including an identification of the payer asset holder ("Payer ID"), the previous version of the electronic asset $T_{old}$, a time of the transfer ("time"), and an identification of the payee asset holder ("Payee ID").

35. An electronic asset system as recited in claim 32, wherein the payee the payee asset holders are equipped with a transmitter to transmit a received electronic asset for inclusion by the fraud sampling unit in the sampled subset.

36. An electronic asset system as recited in claim 32, wherein:
   the fraud sampling unit transmits the list of the bad payer asset holders over a network; and
   the payee asset holders are equipped with a receiver to receive the transmitted list.

37. An electronic asset system as recited in claim 32, wherein the fraud sampling unit broadcasts the list of the bad assets holders over a data communications network selected from a group comprising a wire-based public network, a cable-based entertainment network, and a wireless communications network.

38. An electronic asset system as recited in claim 32, wherein the payee asset holders store the list locally to prevent further use of the electronic assets stored on the bad payer asset holders.

39. An electronic asset system as recited in claim 32, wherein the fraud sampling unit evaluates the sampled subset to determine whether a single transferred electronic asset has been transferred from a single payer wallet to multiple payee electronic wallets, the multiple transfers being indicative of fraudulent use on part of the single payer electronic wallet.

40. An electronic asset system as recited in claim 32, wherein:
  each certificate is issued on an issue date for a selected time period, the certificate being configured to expire on an expiration date following the selected time period after the issue date; and
  the asset holders are updated with new certificates prior to the expiration date of the certificates, each new certificate containing a new cryptographic signing key and being digitally signed by the certifying authority.

41. An electronic asset system as recited in claim 32, wherein the asset issuing unit is the certifying authority that digitally signs the certificates for the asset holders.

42. An electronic asset system as recited in claim 32, wherein the certificates are blindly signed by the asset issuing unit without identity of the asset holders.

43. An electronic asset system as recited in claim 32, wherein the certificates issued to the payee asset holders include a bad credit count of the number of fraudulently used electronic assets received by the payee asset holders.

44. An electronic asset system as recited in claim 43, wherein the certificates expire and the payee asset holders update their certificates, the updated certificates continuing the bad credit count of the expired certificates.

45. An electronic asset system as recited in claim 44, wherein the asset issuing unit blindly signs the updated certificates and employs zero knowledge proof to ensure that the bad credit count is continued.

46. A method for detecting fraudulent transactions involving electronic assets, the method comprising the following steps:
  issuing transferable electronic assets;
  storing the electronic assets in electronic wallets;
  spending at least some of the electronic assets contained on the electronic wallets by transferring the electronic assets from payer electronic wallets to payee electronic wallets;
  extracting a sample of the spent electronic assets;
  detecting from the sample of spent electronic assets whether there is one or more bad electronic assets that have been spent in a fraudulent manner; and
  upon detecting a bad electronic asset, identifying an electronic wallet from which the bad electronic asset was spent.

47. A method as recited in claim 46, wherein the issuing step comprises the step of blindly issuing the transferable electronic assets without knowledge of identities of the electronic wallets.

48. A method as recited in claim 46 further comprising the following steps:
  digitally signing the electronic assets with an initial signature during said issuing step; and
  digitally signing the electronic assets with signatures of the payer electronic wallets that transfer the electronic assets to produce a registry of signatures for each electronic asset which evidences the payer electronic wallets that have transferred the electronic assets.

49. A method as recited in claim 46, wherein the issuing step comprises the step of issuing a digitally signed stick of multiple electronic assets in which the electronic wallets can transfer individual ones to distinct payees of the electronic assets from the stick without transferring the stick as a whole.

50. A method as recited in claim 46, wherein the spending step comprises the additional step of generating at the payer electronic wallet a new version of an electronic asset, $T_{new}$, for transfer to the payee electronic wallet, the new version $T_{new}$ being a concatenation of a previous version of the electronic asset, $T_{old}$, originally received by the payer electronic wallet and a signed representation of the previous version $T_{old}$.

51. A method as recited in claim 50, wherein the generating step comprises generating the new version of the electronic asset as follows:

$$T_{new} = T_{old}, S_{Kpayer}[\text{Hash}(\text{Payer ID}, T_{old}, \text{time}, \text{Payee ID})]$$

wherein "$S_{Kpayer}$" is a signing function using a cryptographic key of the payer electronic wallet and "Hash" is a hashing function used to compute a hash digest of data including an identification of the payer electronic wallet ("Payer ID"), the previous version of the electronic asset $T_{old}$, a time of the transfer ("time"), and an identification of the payee electronic wallet ("Payee ID").

52. A method as recited in claim 46, further comprising the step of transmitting transferred electronic assets from the payee electronic wallets to a fraud sampling unit for possible inclusion in the sampled subset.

53. A method as recited in claim 46, wherein the detecting step comprises the additional step of evaluating the sampled subset to determine whether a single electronic asset has been transferred from a single payer wallet to multiple payee electronic wallets, the multiple transfers being indicative of fraudulent use on part of the single payer electronic wallet.

54. A method as recited in claim 46, further comprising the following steps:
  assigning certificates to corresponding ones of the electronic wallets, the certificates having an expiration date whereupon expiration, the electronic wallets are prohibited from spending the electronic assets stored thereon; and
  updating the certificates before the expiration date.

55. A method as recited in claim 54, further comprising the additional step of ceasing to issue electronic assets or certificates during a time period in which the certificates are updated.

56. A method as recited in claim 46, further comprising the following steps:
  assigning certificates to the electronic wallets; and
  accumulating within the certificates of the payee electronic wallets bad credit counts of the number of fraudulently used electronic assets accumulated by the payee electronic wallets.

57. A method as recited in claim 56, further comprising the step of continuing the bad credit count in new certificates issued at the expiration of old certificates.

58. A method as recited in claim 46, further comprising the following steps:
  assigning certificates to the electronic wallets;

accumulating within the certificate of each payee electronic wallet a bad credit count of a number of fraudulently used electronic assets accumulated by the payee electronic wallet;

detecting when the bad credit count exceeds a bad credit limit; and revoking the payee electronic wallet when the bad credit limit is exceeded.

59. A computer-implemented method for detecting fraudulent transactions involving transferable electronic assets used by electronic wallets, the electronic assets being transferred from payer electronic wallets to payee electronic wallets, the computer-implemented method comprising the following steps:

extracting a sample of the transferred electronic assets;

marking a transferred electronic asset as a bad electronic asset when the transferred electronic asset is transferred from a single payer electronic wallet to multiple payee electronic wallets;

identifying a payee electronic wallet from which the bad electronic asset was transferred as a bad electronic wallet; and compiling a list of bad electronic wallets.

60. A computer-implemented method as recited in claim 59, wherein the electronic wallets have associated certificates, the method further comprising broadcasting a list of certificates for the bad electronic wallets.

61. A computer-readable medium having computer-executable instructions which direct a computer to perform the steps of the method as recited in claim 59.

62. A computer programmed to perform the steps of the method as recited in claim 59.

63. A computer-readable data structure for holding the list of bad electronic wallets that is generated by the steps of the method as recited in claim 59.

64. A method for transferring an electronic asset $T_i$ from a payer to a payee, comprising the step of generating, at the payer, a next version of the electronic asset $T_{i+1}$ for transfer to the payee which is a concatenation of the electronic asset $T_i$ received by the payer and a signed representation of the previous version $T_i$.

65. A method as recited in claim 64, wherein the generating step comprises generating the next version of the electronic asset as follows:

$$T_{i+1}=T_i, S_{Kpayer}[\text{Hash}(\text{Payer ID}, T_i, \text{time}, \text{Payee ID})]$$

wherein "$S_{Kpayer}$" is a signing function using a cryptographic key of the payer electronic wallet and "Hash" is a hashing function used to compute a hash digest of data including an identification of the payer electronic wallet ("Payer ID"), the electronic asset $T_i$, a time of the transfer ("time"), and an identification of the payee electronic wallet ("Payee ID").

66. A computer programmed to perform the steps of the method as recited in claim 64.

67. A computer-readable medium having computer-executable instructions which direct a computer to perform the steps of the method as recited in claim 64.

* * * * *